US006721373B1

(12) United States Patent
Frenkel et al.

(10) Patent No.: US 6,721,373 B1
(45) Date of Patent: Apr. 13, 2004

(54) MULTI-TONE RECEIVER AND A METHOD FOR OPERATING THE SAME

(75) Inventors: Liron Frenkel, Natania (IL); Ilan Reuven, Ramat Gan (IL)

(73) Assignee: Tioga Technologies Ltd., Tel Aviv (IL)

( * ) Notice: Subject to any disclaimer, the term of this patent is extended or adjusted under 35 U.S.C. 154(b) by 0 days.

(21) Appl. No.: 09/538,572

(22) Filed: Mar. 29, 2000

(51) Int. Cl.[7] .......................... H03D 1/04; H03D 1/06; H03K 5/01; H03K 6/04; H04B 1/10

(52) U.S. Cl. ........................ 375/346; 714/746; 714/784

(58) Field of Search ................................ 375/346, 340, 375/148; 714/784, 752

(56) References Cited

U.S. PATENT DOCUMENTS 4,821,268 A 4/1989 Berlekamp .................. 371/37
5,712,861 A * 1/1998 Inoue et al. ................ 714/752
5,742,620 A 4/1998 Iwamura .................. 371/37.11

* cited by examiner

*Primary Examiner*—Stephen Chin
*Assistant Examiner*—Curtis Odom
(74) *Attorney, Agent, or Firm*—Darby & Darby

(57) ABSTRACT

Impulsive noise is detected for each discrete multi-tone (DMT) symbol. If impulsive noise is detected, all bytes, which belong to the associated DMT symbol are tagged by "erasure bits". After interleaving, Reed-Solomon decoding is initially performed without erasures. If the decoding fails, it is performed again, this time with erasures. Reed-Solomon decoders report failure with relatively high certainty, and thus, if the first stage (decoding without erasures) includes failure or errors due to impulsive noise, the second stage of decoding is performed again with erasures.

59 Claims, 4 Drawing Sheets

MULTI-TONE RECEIVER AND A METHOD FOR OPERATING THE SAME

BACKGROUND OF THE INVENTION

1. Field of the Invention

The present invention is directed to a multi-tone receiver and a system for operating the same.

2. Description of Related Art

The communication channel is the set of a physical medium, device and system that connects the transmitter to the receiver. The transmitter and receiver include an encoder and decoder, respectively, for translating the information stream produced by the source into a signal suitable for channel transmission, and vice versa. Some communications channels are impaired by impulsive noise. One way to maintain the relatively high integrity of the channels is to use an error correcting code, which restores the original data when corrupted by impulsive noise. A conventional encoding method for impulsive noise in a channel and used for asymmetrical digital subscriber line (ADSL) is described in the ITU G.992.1 standard, which is incorporated herein by reference. This particular scheme uses a Reed-Solomon encoder followed by a byte-interleaver. An ADSL decoder typically comprises a byte-deinterleaver, which distributes the bytes hit by impulsive noise between multiple Reed-Solomon code words, and a conventional Reed-Solomon decoder, which corrects the errors in each of the code words.

Correction capabilities or results of a Reed-Solomon decoder may be improved by using erasures to indicate when the reliability of the input bytes are corrupted. Applying this knowledge to a multi-tone system operating in an environment of impulsive noise, impulsive noise may be detected by measuring the accumulative error over one or more tones of a multi-tone symbol, since multiple tones will be impaired by the impulsive noise. Bytes of a symbol suspected to be corrupted or hit by impulsive noise may then be marked as erasures.

The use of erasures, however, is disadvantageous when no impulsive noise is present, since false alarm impulsive noise indicators may reduce the correction capabilities of the Reed-Solomon decoder. In addition, the detection threshold level is very limited. Specifically, on the one hand, a relatively high detection sensitivity may produce false alarms and reduce the performance when little, if any, impulsive noise is present; whereas, on the other hand, a relatively low detection sensitivity may result in missed detection of impulsive noise, thereby reducing the correction capabilities when impulsive noise is present.

It is therefore desirable to develop a system and method for use on a multi-tone symbol that exploits the advantages of using erasures when impulsive noise is present, without impairing the correction performance if no impulsive noise is present.

SUMMARY OF THE INVENTION

Impulsive noise is estimated for each discrete multi-tone (DMT) symbol. If impulsive noise is detected, all bytes, within the associated DMT symbol are tagged by "erasure bits". After interleaving, Reed-Solomon decoding is initially performed without erasures. If the decoding fails, it is performed again, this time with erasures. Reed-Solomon decoders report failure with relatively high certainty. Therefore, if the first stage (decoding without erasures) fails to decode into a proper codeword and impulsive noise is present, the second stage of decoding is performed again with erasures.

In a first embodiment, the multi-tone receiver in accordance with the present invention includes a decoder operable in one of two modes, a first mode without erasures for producing a first decoded data block and a second mode with erasures for producing a second decoded data block. The decoder generates a decoding-failure indicator when a decoding failure is detected. In addition, the receiver includes a controller which initiates the decoder to receive an input block of data; activates the decoder to operate in the first mode or the second mode based on the decoding-failure indicator reported by the decoder; and selects as an output from the decoder the first or second decoded data block output based on the decoding-failure indicator reported by the decoder.

The invention is also directed to a method for operating the multi-tone receiver described above. Initially, an input data block is decoded without erasures to produce a first decoded data block. A determination in then made whether a decoding-failure indicator is generated by the decoder. If a decoding-failure indicator is generated, the input data block is decoded with erasures to produce a second decoded data block. The decoded data block output from the decoder is selected between the first and second decoded data blocks based on a decoding-failure indicator. Alternatively, the input data block may be first decoded with erasures and then, decoded without erasures based on the decoding-failure indicator.

In a second embodiment, instead of using one decoder operable in two modes, the receiver may be designed with two parallel decoders, processing the same input bytes, simultaneously. The multi-tone receiver includes a first decoder for decoding without erasures a sample block to produce a first decoded data block, a second decoder for decoding with erasures the sample block to produce a second decoded data block, means for generating a decoding-failure indicator when a decoding failure is detected by one of said first and second decoders, and means for selecting between the first and second decoded data block based on the presence of a decoding-failure indicator.

The invention also relates to the method for operating the multi-tone receiver configured in accordance with the second embodiment of the invention. Initially, an input data block is decoded without erasures using a first decoder to produce a first decoded data block, and is decoded with erasures using the second decoder to produce a second decoded data block. A decoding-failure indicator is generated when a decoding failure is detected by the first or second decoders and a selection is made between the first and second decoded data block based on the presence of a decoding-failure indicator.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE PREFERRED EMBODIMENTS

Figure 1:
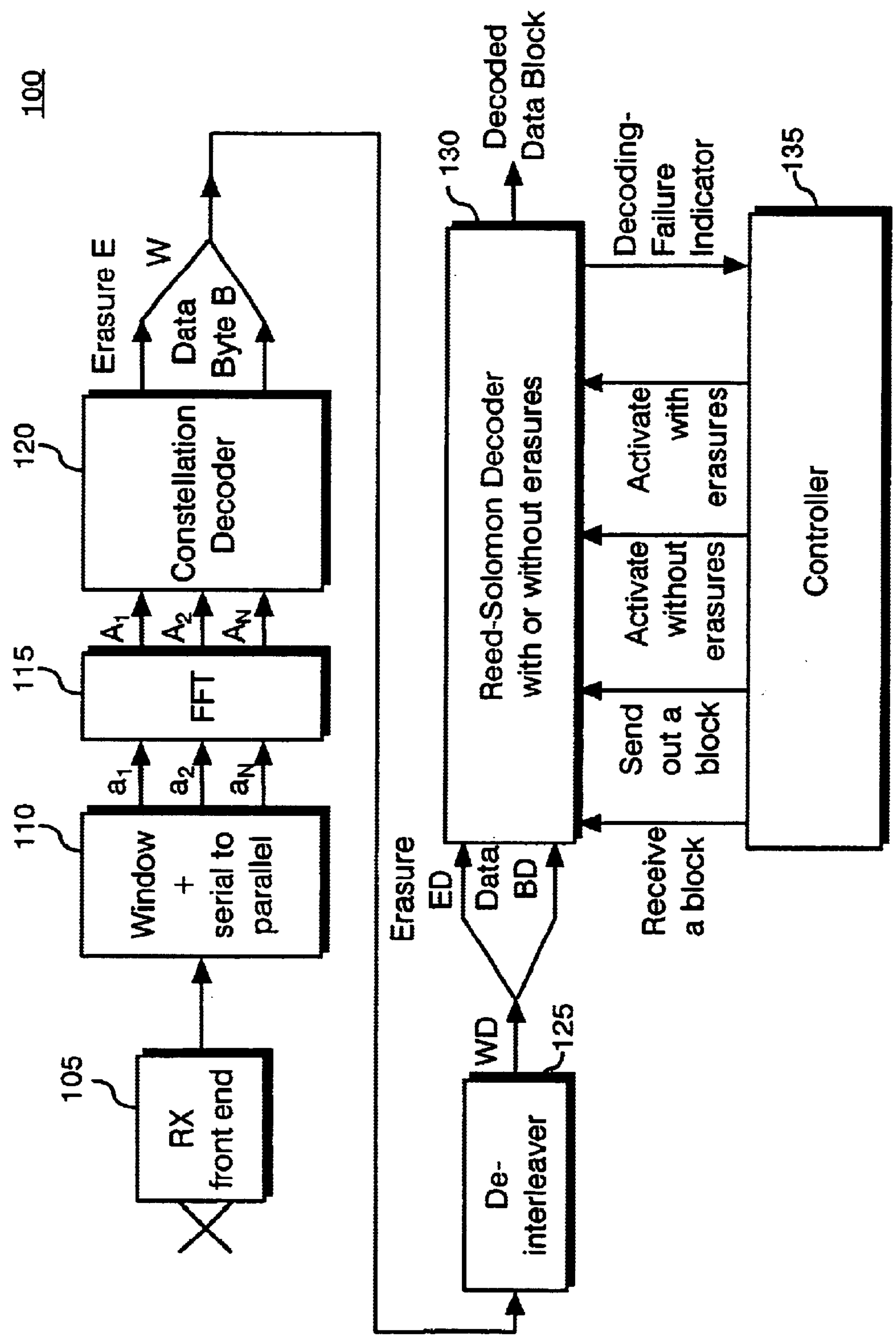
FIG. 1 is a multi-tone receiver in accordance with the present invention.

FIG. 1 is an asymmetric digital subscriber line discrete multi-tone (ADSL DMT) receiver 100 in accordance with the present invention. Front end receiver 105 includes analog filters, an analog to digital converter (ADC), and digital filtering (not shown), as is well known in the field. For each period of a discrete multi-tone (DMT) symbol, a block of samples is grouped into a vector $a_i$ using, for example, a windowing technique known in the field of DMT modulation, and then transformed by serial to parallel converter 110 and fed to a Fast Fourier Transform (FFT) 115, wherein the vector is converted to a vector $A_i$. The FFT 115 also preferably includes a frequency domain equalizer (FEQ)(not shown) to equalize the channel's phase and amplitude distortion for each tone.

A constellation decoder 120 is used to generate erasure bits. In particular, constellation decoder 120 maps each element in the vector $A_i$ to a constellation point $CONST_i$, where i represents a tone of the multi-tone symbol. In addition, the constellation decoder 120 also calculates a distance vector $D_i$ representing the Euclidean distance between the vector $A_i$ and its associated constellation point $CONST_i$ as $$D_i^2=(A_i-CONST_i)^2$$

Each constellation point is mapped by the constellation decoder 120 to 1–15 bits, and a bit stream is produced by concatenating bits from all tones. This bit stream is then converted by the constellation decoder 120 to a data byte stream B by grouping eight consecutive bits into a byte, using operations and techniques well known to one of ordinary skill in the technology of ADSL modulation. A distance vector Di, representing a detector-error, of two or more tones of the multi-tone symbol are summed to obtain a metric (MET) related to the noise in a single DMT symbol and represented as $$MET=\Sigma D_i^2$$

where, i represents one tone of the multi-tone symbol.

The metric MET is then compared to a threshold, representing the noise level within a symbol which is regarded as an effect of impulsive noise. The threshold value may be a fixed value, or alternatively, may be changed dynamically based on channel conditions. For instance, the threshold value may be increased if no impulsive noise is detected for a given period of time. If MET is greater than the threshold then all of the data bytes B associated with the DMT symbol are tagged by an erasure bit E, resulting in a 9 bit word W. Alternatively, the sum of the additive inverses of each detector error may be compared to a threshold and the data bytes tagged if the sum is less than the threshold. The word W is then fed to a deinterleaver 125, similar in operation to a conventional ADSL deinterleaver, except that 9-bit words are deinterleaved instead of bytes. The 9-bit word output WD of the deinterleaver is again separated into an eight bit data byte BD and an erasure bit ED, which are fed to a conventional Reed-Solomon decoder 130 that is controlled by controller 135. In particular, controller 135 is capable of causing the decoder 130 to receive a block of samples from the de-interleaver 125, outputting from the decoder a decoded data block, activating the decoder to operating in a first mode without erasures, activating the decoder to operate in a second mode with erasures, and receiving a decoding-failure indicator from the decoder, as will be described in further detail below.

Figure 2A:
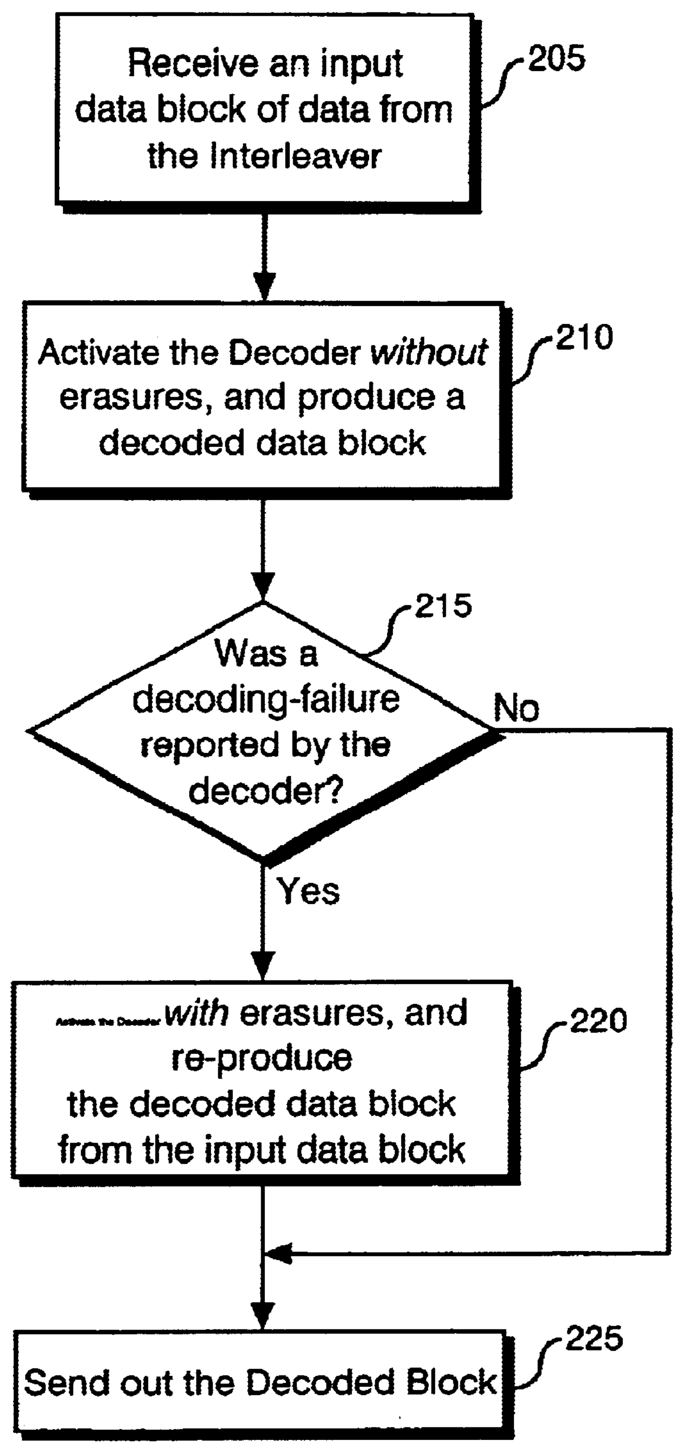
FIG. 2*a* is a flow chart of an embodiment of a method for operating the controller in the mutli-tone ADSL DMT receiver of FIG. 1 in accordance with the present invention.

FIG. 2a is a flow chart of a first embodiment of the operation of the controller 135 in the multi-tone receiver 100 in FIG. 1. Initially, in step 205, controller 135 causes the decoder 130 to receive a block of data from the de-interleaver 125. Then in step 210, controller 135 activates the decoder 130 to operate in a first mode without erasures and a first decoded data block without erasures is produced. A determination is made in step 215, whether a decoding-failure indicator was generated or reported by the decoder 130. If a decoding-failure indicator is generated by the decoder, then in step 220 the second mode of operation of the decoder with erasures is activated by the controller 135 and a second decoded data block with erasures is reproduced from the original input data block and output from the decoder. Otherwise, if a failure is not reported by the decoder, then the first decoded data block is output from the decoder in step 225.

Figure 2B:
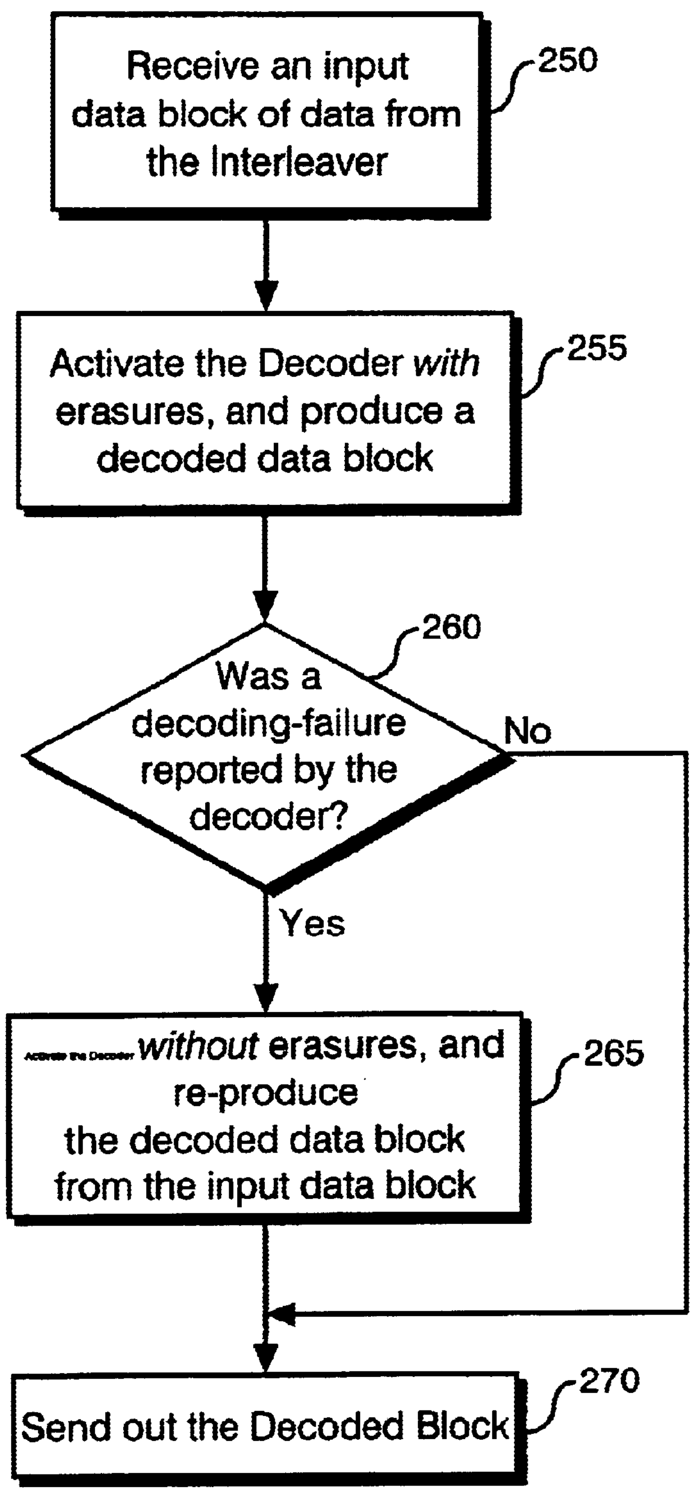
FIG. 2*b* is a flow chart of another embodiment of a method for operating the controller in the mutli-tone ADSL DMT receiver of FIG. 1 in accordance with the present invention.

Detection of the decoding failure is not exact, especially when the redundancy of the Reed-Solomon code is relatively small. Therefore, it is possible for a failure or error to exist without being detected. Performing the decoding without erasures (in FIG. 2a) insures that the performance of the decoder will not be degraded with respect to a conventional (single-iteration) decoder without erasures. This scheme is applicable when performance in a channel without impulsive noise must not be compromised. In an alternative embodiment in accordance with the present invention and shown in FIG. 2b, a first stage of decoding may be performed with erasures, followed by a second decoding stage without erasures. Performing the decoding with erasures (in FIG. 2b) insures that the performance of the decoder will not be degraded with respect to a conventional (single-iteration) decoder with erasures. The scheme shown in FIG. 2b is suitable when performance in a channel with impulsive noise must not be compromised.

Figure 3:
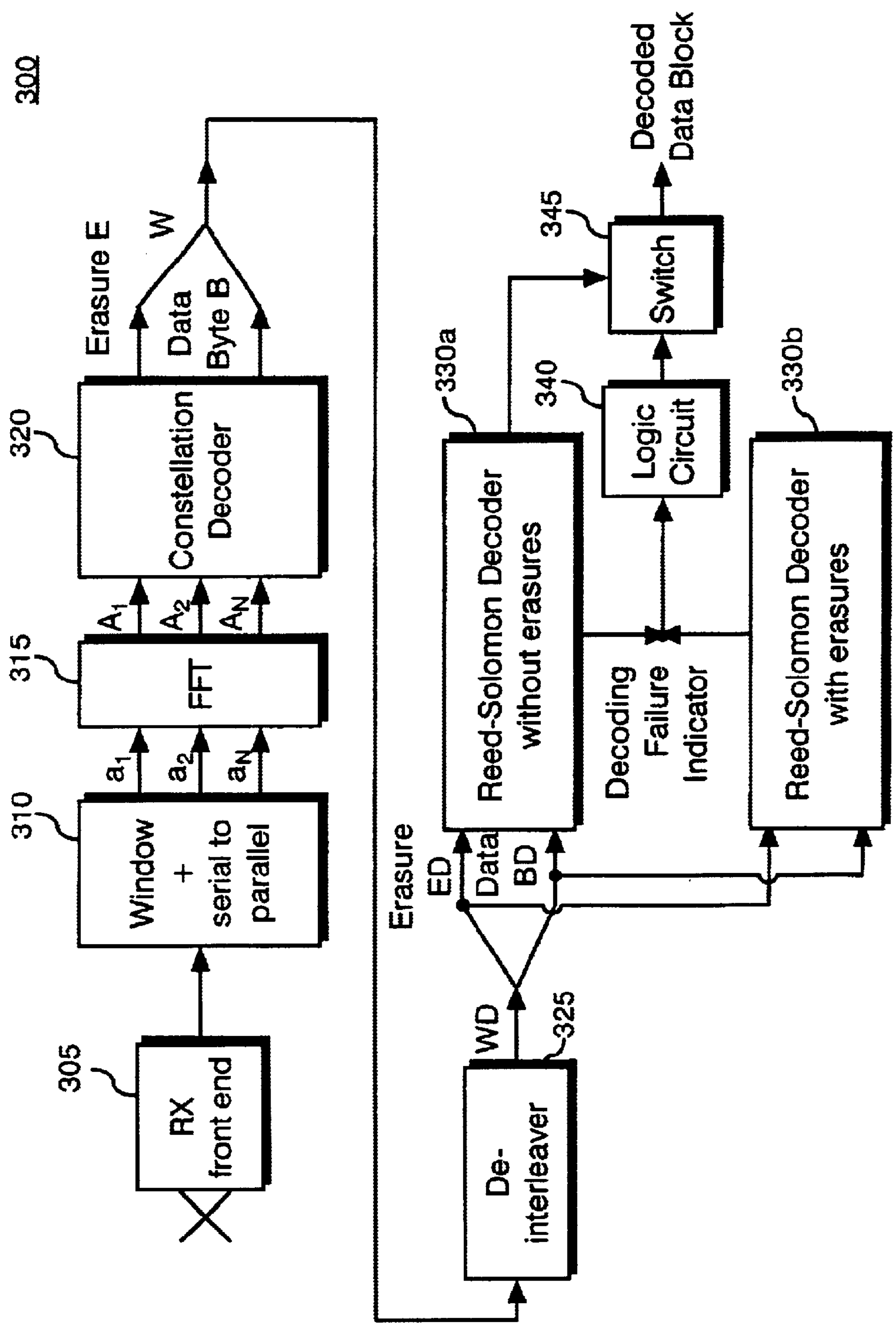
FIG. 3 is another embodiment of a multi-tone receiver in accordance with the present invention.

Furthermore, although the multi-tone receiver shown in FIG. 1 has a single decoder 130 that is switched between two modes, one with erasures and the other without erasures, in an alternative embodiment in accordance with the present invention, decoding may be performed in parallel by two conventional Reed-Solomon decoders, one with erasures and the other without erasures. This alternative embodiment shown in FIG. 3 is similar to the embodiment shown in FIG. 1, except that instead of the receiver 100 (FIG. 1) including a single decoder 130 operable in two modes and a controller 135, receiver 300 includes a first decoder 330a, a second decoder 330b, a logic circuit, and a switch 345. The first decoder 330 operates without erasures, whereas the second decoder 330b operates with erasures. Logic circuit 340 receives from decoders 330a, 330b a decoding-failure indicator. Based on the logic results of the decoding-failure indicators of the two decoders 330a, 330b, the logic circuit will cause switch 345 to output the decoded data block produced by the first decoder 330a or the second decoder 330b.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A multi-tone receiver which receives an input data block, comprising:

a decoder for decoding the input data block operable in one of two modes, a first mode without erasures for producing a first decoded data block and a second mode with erasures for producing a second decoded data block, said decoder generating a decoding-failure indicator when a decoding failure is detected;

a constellation decoder for generating erasure bits operative to obtain a sum of additive inverses of detector errors of at least two tones in a multi-tone symbol of said input block of data, compare the sum to a decoding failure threshold, and tag bytes of associated multi-tone symbols with an erasure bit, when the sum is less than the threshold; and a controller for initiating said decoder to receive said input block of data; activating said decoder to operate in at least one of the first mode and the second mode based on the decoding-failure indicator reported by said decoder; and selecting as an output from said decoder one of the first and second decoded data block output based on the decoding-failure indicator reported by said decoder.

2. A multi-tone receiver in accordance with claim 1, wherein said decoder operates in the second mode with erasures, when a decoding failure is detected.

3. A multi-tone receiver in accordance with claim 1, wherein said decoder outputs the first decoded data block, when a decoding failure is not detected.

4. A multi-tone receiver in accordance with claim 1, wherein said decoder outputs the second decoded data block, when a decoding failure is detected.

5. A multi-tone receiver in accordance with claim 1, wherein said constellation decoder, for the multi-tone symbol, detects the presence of impulsive noise and tags bytes of associated multi-tone symbols, for which impulsive noise has been detected, with an erasure bit.

6. A multi-tone receiver in accordance with claim 5, wherein said constellation decoder is operable to obtain a sum of detector errors of at least two tones in the multi-tone symbol, compare the sum to a decoding failure threshold, and tag bytes of associated multi-tone symbols with an erasure bit, when the sum is greater than the threshold.

7. A multi-tone receiver in accordance with claim 6, wherein the decoding failure threshold is a predetermined fixed value.

8. A multi-tone receiver in accordance with claim 6, wherein the decoding failure threshold is an adaptive value, based on channel conditions.

9. A multi-tone receiver in accordance with claim 1, further comprising a de-interleaver for de-interleaving the data bits and erasure bits.

10. A multi-tone receiver in accordance with claim 1, wherein said decoder is a Reed-Solomon decoder.

11. A multi-tone receiver in accordance with claim 1, wherein said receiver is an asymmetric digital subscriber line discrete multi-tone receiver.

12. A method for operating a multi-tone receiver including a decoder and a controller, comprising the steps of:

decoding without erasures an input data block to produce a first decoded data block;

determining if a decoding-failure indicator is generated by the decoder;

if the decoding-failure indicator is generated, decoding with erasures the input data block to produce a second decoded data block; and selecting as an output one of the first and the second decoded data blocks based on the decoding-failure indicator;

wherein the determining step comprises the steps of:

calculating a sum of additive inverses of detector errors of at least two tones in each multi-tone symbol;

comparing the sum to a decoding failure threshold; and tagging bytes of associated multi-tone symbols with an erasure bit, when the sum is less than the threshold.

13. A method in accordance with claim 12, wherein said determining step comprises the steps of:

detecting the presence of impulsive noise; and tagging bytes of associated multi-tone symbols, for which impulsive noise has been detected, with an erasure bit.

14. A method in accordance with claim 13, wherein said determining step comprises:

calculating a sum of detector errors of at least two tones in each multi-tone symbol;

comparing the sum to a decoding failure threshold; and tagging bytes of associated multi-tone symbols with an erasure bit, when the sum is greater than the threshold.

15. A method in accordance with claim 14, wherein the decoding failure threshold is a predetermined fixed value.

16. A method in accordance with claim 14, wherein the decoding failure threshold is an adaptive value based on channel conditions.

17. A method for operating a multi-tone receiver including a decoder and a controller, comprising the steps of:

decoding without erasures an input data block to produce a first decoded data block;

determining if a decoding-failure indicator is generated by the decoder;

wherein the determining step comprises the steps of:

detecting the presence of impulsive noise;

tagging bytes of associated multi-tone symbols, for which impulsive noise has been detected, with an erasure bit;

calculating a sum of additive inverses of detector errors of at least two tones in each multi-tone symbol;

comparing the sum to a decoding failure threshold; and tagging bytes of associated multi-tone symbols with an erasure bit, when the sum is less than the threshold;

if the decoding-failure indicator is generated, decoding with erasures the input data block to produce a second decoded data block; and selecting as an output one of the first and the second decoded data blocks based on the decoding-failure indicator.

18. A method in accordance with claim 17, wherein the decoding failure threshold is a predetermined fixed value.

19. A method in accordance with claim 17, wherein the decoding failure threshold is an adaptive value based on channel conditions.

20. A method in accordance with claim 12, wherein said selecting step comprises outputting the first decoded data block, in the absence of the decoding-failure indicator.

21. A method in accordance with claim 12, wherein said selecting step comprises outputting the second decoded data block, in the presence of the decoding-failure indicator.

22. A method for operating a multi-tone receiver including a decoder and a controller, comprising the steps of:

decoding with erasures an input data block to produce a first decoded data block;

determining if a decoding-failure indicator is generated by the decoder; if the decoding-failure indicator is generated, decoding without erasures the input data block to produce a second decoded data block; and selecting as an output one of the first and the second decoded data blocks based on the decoding-failure indicator;

wherein the determining step comprises the steps of:

calculating a sum of additive inverses of detector errors of at least two tones in each multi-tone symbol;

comparing the sum to a decoding failure threshold; and tagging bytes of associated multi-tone symbols with an erasure bit, when the sum is less than the threshold.

23. A method in accordance with claim 22, wherein said determining step comprises the steps of:

detecting the presence of impulsive noise; and tagging bytes of associated multi-tone symbols, for which impulsive noise has been detected, with an erasure bit.

24. A method in accordance with claim 23, wherein said determining step comprises:

calculating a sum of detector errors of at least two tones in each multi-tone symbol;

comparing the sum to a decoding failure threshold; and tagging bytes of associated multi-tone symbols with an erasure bit, when the sum is greater than the threshold.

25. A method in accordance with claim 24, wherein the decoding failure threshold is a predetermined fixed value.

26. A method in accordance with claim 24, wherein the decoding failure threshold is an adaptive value based on channel conditions.

27. A method for operating a multi-tone receiver including a decoder and a controller, comprising the steps of:

decoding with erasures an input data block to produce a first decoded data block;

determining if a decoding-failure indicator is generated by the decoder;

wherein the determining step comprises the steps of:

detecting the presence of impulsive noise;

tagging bytes of associated multi-tone symbols, for which impulsive noise has been detected, with an erasure bit;

calculating a sum of additive inverses of detector errors of at least two tones in each multi-tone symbol;

comparing the sum to a decoding failure threshold; and tagging bytes of associated multi-tone symbols with an erasure bit, when the sum is less than the threshold;

if the decoding-failure indicator is generated, decoding without erasures the input data block to produce a second decoded data block; and selecting as an output one of the first and the second decoded data blocks based on the decoding-failure indicator.

28. A method in accordance with claim 27, wherein the decoding failure threshold is a predetermined fixed value.

29. A method in accordance with claim 27, wherein the decoding failure threshold is an adaptive value based on channel conditions.

30. A method in accordance with claim 22, wherein said selecting step comprises outputting the first decoded data block, in the absence of the decoding-failure indicator.

31. A method in accordance with claim 22, wherein said selecting step comprises outputting the second decoded data block, in the presence of the decoding-failure indicator.

32. A multi-tone receiver comprising:

a first decoder for decoding without erasures a sample block to produce a first decoded data block;

a second decoder for decoding with erasures the sample block to produce a second decoded data block;

a constellation decoder for generating erasure bits operative to obtain a sum of additive inverses of detector errors of at least two tones in a multi-tone symbol, compare the sum to a decoding failure threshold, and tag bytes of associated multi-tone symbols with an erasure bit, when the sum is less than the threshold;

means for generating a decoding-failure indicator when a decoding failure is detected by one of said first and second decoders; and means for selecting one of the first and the second decoded data block based on the presence of a decoding-failure indicator.

33. A multi-tone receiver in accordance with claim 32, wherein said selecting means comprises a logic circuit and a switch.

34. A multi-tone reciever in accordance with claim 32, wherein said constellation decoder, for each of a plurality of multi-tone symbols, is operative to detect the presence of impulsive noise and tag bytes of associated multi-tone symbols, for which impulsive noise has been detected, with an erasure bit.

35. A multi-tone reciever in accordance with claim 34, wherein said constellation decoder if operative to obtain a sum of detector errors of at least two tones in each of the plurality of multi-tone symbols, compare the sum to a decoding failure threshold, and tag bytes of associated multi-tone symbols with a erasure bit, when the sum is greater than the threshold.

36. A multi-tone receiver in accordance with claim 35, wherein the decoding failure threshold is a predetermined fixed value.

37. A multi-tone receiver in accordance with claim 35, wherein the decoding failure threshold is an adaptive value, based on channel conditions.

38. A multi-tone receiver comprising:

a first decoder for decoding without erasures the sample block to produce a first decoded data block;

a second decoder for decoding with erasures the sample block to produce a second decoded data block;

means for generating a decoding-failure indicator when a decoding failure is detected by one of said first and second decoders;

means for selecting one of the first and the second decoded data block based on the presence of the decoding-failure indicator;

a constellation decoder for generating erasure bits operable to, for each of a plurality of multi-tone symbols, detect the presence of impulsive noise and tag bytes of associated multi-tone symbols, for which impulsive noise has been detected, with an erasure bit; and wherein the constellation decoder is further operable to obtain a sum of additive inverse of detector errors of at least two tones in each of the plurality of multi-tone symbols, compare the sum to a decoding failure threshold, and tag bytes of associated multi-tone symbols with a erasure bit, when the sum is less than the threshold.

39. A multi-tone receiver in accordance with claim 38, wherein the decoding failure threshold if a predetermined fixed value.

40. A multi-tone receiver in accordance with claim 38, wherein the decoding failure threshold is an adaptive value, based on channel conditions.

41. A multi-tone receiver in accordance with claim 34, further comprising a de-interleaver for de-interleaving the data bits and erasure bits.

42. A multi-tone receiver in accordance with claim 32, wherein said decoder is a Reed-Solomon decoder.

43. A multi-tone receiver in accordance with claim 32, wherein said receiver is an asymmetric digital subscriber line discrete multi-tone receiver.

44. A method for operating a multi-tone receiver, which receives an input data block, including a first decoder and a second decoder, said method comprising the steps of:

decoding without erasures the input data block using the first decoder to produce a first decoded data block;

decoding with erasures the input data block using the second decoder to produce a second decoded data block;

providing a constellation decoder for generating erasure bits;

the constellation decoder further obtaining a sum of additive inverses of detector errors of at least two tones in a multi-tone symbol of said input data block, comparing the the sum to a decoding failure threshold, and tagging bytes of associated multi-tone symbols with an erasure bit, when the sum is less than the threshold;

generating a decoding-failure indicator when a decoding failure is dectected by one of said first and second decoders; and selecting one of the first and the second decoded data block based on the presence of the decoding-failure indicator.

45. A method for operating a multi-tone receiver in accordance with claim 44, wherein the selecting step comprises operating a logic circuit and a switch.

46. A method in accordance with claim 44 further comprising the steps of:

the constellation decoder, for each of a plurality of multi-tone symbols, detecting the presence of impulsive noise; and tagging bytes of associated multi-tone symbols, for which impulsive noise has been detected, with an erasure bit.

47. A method in accordance with claim 46, further comprising the steps of:

the constellation decoder obtaining a sum of detector errors of at least two tones in a multi-tone symbol of the input data block;

comparing the sum to a decoding failure threshold; and tagging bytes of associated multi-tone symbols with an erasure bit, when the sum is greater than the threshold.

48. A method in accordance with claim 47, wherein the decoding failure threshold is a predetermined fixed value.

49. A method in accordance with claim 47, wherein the decoding failure threshold is an adaptive value, based on channel conditions.

50. A method for operating a multi-tone receiver including a first decoder and a second decoder, said method comprising the steps of:

decoding without erasures an input data block using the first decoder to produce a first decoded data block;

decoding with erasures the input data block using the second decoder to produce a second decoded data block;

providing a constellation decoder for generating erasure bits;

the constellation decoder, for each of a plurality of multi-tone symbol, detecting the presence of impulsive noise; and tagging bytes of associated multi-tone symbols, for which impulsive noise has been detected, with an erasure bit;

generating a decoding-failure indicator when a decoding failure is detected by one of said first and second decoders;

selecting one of the first and the second decoded data block based on the presence of a decoding-failure indicator; and the constellation decoder further obtaining a sum of additive inverses of detector errors of at least two tones in a multi-tone symbol of the input data block, comparing the sum to a decoding failure threshold, and tagging bytes of associated multi-tone symbols with an erasure bit, when the sum is less than the threshold.

51. A method in accordance with claim 50, wherein the decoding failure threshold is a predetermined fixed value.

52. A method in accordance with claim 50, wherein the decoding failure threshold is an adaptive value, based on channel conditions.

53. A method in accordance with claim 44, further comprising the step of providing a de-interleaver for de-interleaving the data bits and erasure bits.

54. A method in accordance with claim 44, wherein said first and second decoders are Reed-Solomon decoders.

55. A method in accordance with claim 44, wherein said receiver is an asymmetric digital subscriber line discrete multi-tone receiver.

56. A method in accordance with claim 17, wherein said selecting step comprises outputting the first decoded data block, in the absence of the decoding-failure indicator.

57. A method in accordance with claim 17, wherein said selecting step comprises outputting the second decoded data block, in the presence of the decoding-failure indicator.

58. A method in accordance with claim 27, wherein said selecting step comprises outputting the first decoded data block, in the absence of the decoding-failure indicator.

59. A method in accordance with claim 27, wherein said selecting step comprises outputting the second decoded data block, in the presence of the decoding-failure indicator.

* * * * *